United States Patent [19]

Kerger et al.

[11] Patent Number: 5,037,063

[45] Date of Patent: Aug. 6, 1991

[54] VALVE ARRANGEMENT WITH A RESIDUAL-PRESSURE VALVE FOR THE FILLING AND EMPTYING OF A GAS HOLDER

[75] Inventors: Leon Kerger, Helmdange; Paul Kremer, Walferdange, both of Luxembourg

[73] Assignee: Ceodeux S.A., Luxembourg

[21] Appl. No.: 586,904

[22] Filed: Sep. 24, 1990

[30] Foreign Application Priority Data

Oct. 11, 1989 [LU] Luxembourg .......................... 87607

[51] Int. Cl.[5] .............................................. F16L 37/28

[52] U.S. Cl. .............................. 251/149.8; 251/149.4; 222/3; 141/18

[58] Field of Search ............... 251/149.3, 149.6, 149.4; 222/3, 402.16, 497; 141/18, 21; 137/540

[56] References Cited

U.S. PATENT DOCUMENTS

| | | | |
|---|---|---|---|
| 2,645,241 | 7/1953 | Riede | 141/18 |
| 2,686,534 | 8/1954 | Montelius | 137/540 |
| 3,744,526 | 7/1973 | Macoviel | 141/18 |
| 4,210,168 | 7/1980 | Yonezawa | 141/18 |
| 4,402,340 | 9/1983 | Lockwood, Jr. | 141/21 |
| 4,662,393 | 5/1987 | Genbuffe et al. | 137/613 |

FOREIGN PATENT DOCUMENTS

| | | | |
|---|---|---|---|
| 557 | 11/1899 | Austria | 222/3 |

*Primary Examiner*—A. Michael Chambers

*Attorney, Agent, or Firm*—Leydig, Voit & Mayer

[57] ABSTRACT

For the filling and for the vacuum emptying of the gas holder, there is a first connection fitting (12) screwable into the valve body (6) of the valve arrangement (4), with sealing-off points at a first location (34) of the valve body (6) of the valve arrangement (4), while, for the normal gas-extraction mode, there is a second connection fitting (50) screwable into the valve body (6), with sealing-off points at a second location (52) of the valve body (6) of the valve arrangement (4), this second location (52) being situated downstream of the said first location (34). The interior of the valve body (6) between the said first location (34) and the second location (52) is connected by means of a bypass channel (54) to the space between the lower part of the shut-off screw body (10) and the upper part of the residual-pressure valve (8).

2 Claims, 2 Drawing Sheets

VALVE ARRANGEMENT WITH A RESIDUAL-PRESSURE VALVE FOR THE FILLING AND EMPTYING OF A GAS HOLDER

The invention relates to a valve arrangement with a residual-pressure valve for the filling and emptying of a gas holder, especially one for gases of high purity.

It is known to equip gas holders for high-purity gases used, for example, in the manufacture of optical fibers or in the manufacture of semiconductors, especially for the doping of these, with a so-called residual-pressure valve which performs the function, when the gas holder is being emptied, of closing automatically when the gas holder pressure has reached a predetermined minimum value, namely the residual pressure, which is above the ambient pressure. It thus becomes impossible for impurities to penetrate into the gas holder from the ambient atmosphere.

For refilling the gas holder, the said residual-pressure valve must of course be open, and this can be achieved either manually or automatically by means of the pressure of the fresh gas.

The disadvantage of known manual actuations of the residual-pressure valve is that they can inadvertently be left open after the completion of the filling operation, so that, during a subsequent gas extraction, the gas holder can empty down to the ambient pressure, thus entailing the abovementioned risks that impurities will penetrate from the ambient atmosphere. Residual-pressure valves which operate automatically are therefore advantageous.

However, the disadvantage of the known valve arrangements according to the state of the art, operating with residual-pressure valves which operate automatically, is that they have a construction which is complicated, that is to say involves high outlay, and/or require a disturbingly large amount of space; furthermore, the changeover from the normal gas-extraction mode to the refilling operation or to the remaining emptying of the gas holder almost to a vacuum, hereafter referred to in brief as vacuum emptying, often entails complicated manipulations. A further disagreeable and harmful phenomenon which occurs during refilling is a fluttering of the residual-pressure valve.

To avoid these disadvantages of the state of the art, the object of the invention is, therefore, to provide a valve arrangement of the generic type mentioned in the introduction, which has an extremely simple construction and requires only a small amount of space and which can be changed over very simply from the gas-extraction mode to refilling, or to vacuum emptying.

To achieve this object, the invention provides a valve arrangement with a residual-pressure valve for the filling and emptying of a gas holder, especially one for gases of high purity, the residual-pressure valve being designed in the form of a piston and being axially aligned with a shutoff screw body of the valve arrangement, with a compression spring which determines the residual pressure and which is arranged axially between the piston-shaped residual-pressure valve and the shutoff screw body, so that, to close a gas inflow orifice from the gas holder into the valve body, the residual-pressure valve is pressed against a seat at the inflow orifice by the spring when the residual pressure is reached, characterized in that, for the filling and for the vacuum emptying of the gas holder, there is a first connection fitting screwable into the valve body of the valve arrangement, with sealing-off points at a first location of the valve body of the valve arrangement, in that, for the normal gas-extraction mode, there is a second connection fitting screwable into the valve body, with sealing-off points at a second location of the valve body of the valve arrangement, this second location being situated downstream of the said first location, and in that the interior of the valve body between the said first and second locations is connected by means of a bypass channel to the space between the lower part of the shut-off screw body and the upper part of the residual-pressure valve.

An exemplary embodiment of the invention is illustrated in the drawings, in which like parts bear the same reference numerals, and is described in more detail below. In the drawings.

Figure 1:
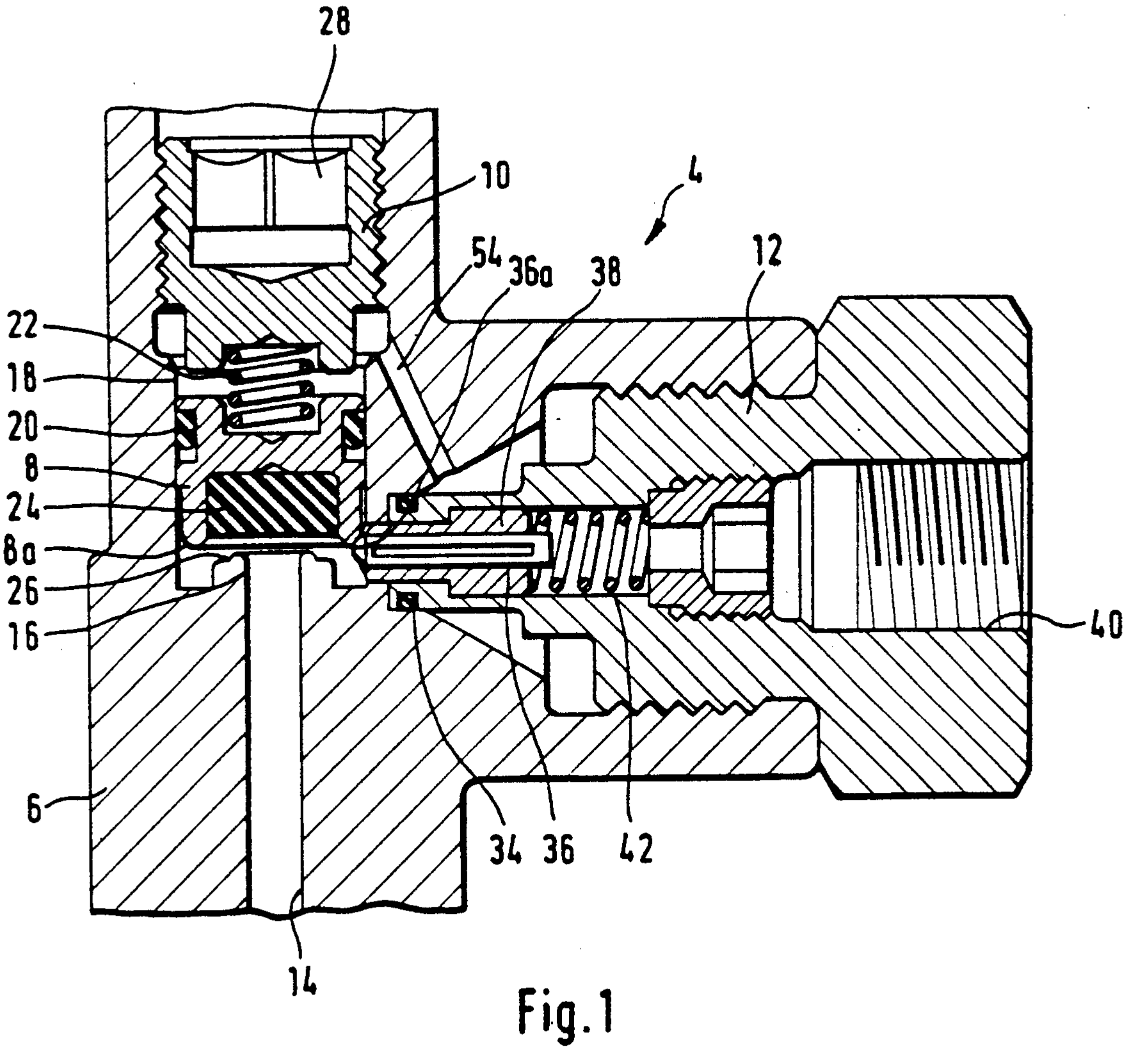
FIG. 1 shows the valve arrangement according to the invention with a first connection fitting for the filling or for the vacuum emptying of the gas holder.

FIG. 1 shows the valve arrangement 4 according to the invention, consisting essentially of a valve body 6, of a residual-pressure valve 8 and of a shutoff screw body 10, and, where this FIG. 1 is concerned, a connection fitting 12 for the refilling or the vacuum emptying of a gas holder (not shown), such as, for example, a gas cylinder.

A gas line in the form of a bore 14 in the valve body 6 leads from the gas holder (not shown) into the interior of the valve body. The inflow orifice 16 into the interior of the valve body 6 can be closed or opened by means of the residual-pressure valve 8.

For this purpose, the residual-pressure valve 8 according to the invention is designed essentially as a piston which is axially displaceable in a bore 18 of the valve body 6; a gastight sealing between the valve 8 and the bore 18 is obtained here by means of an O-ring 20.

Between the shutoff screw body 10 and the valve 8 there is a compression spring 22 which is dimensioned such that, with the shutoff screw body 10 in the opening position, the residual-pressure valve 8 is pressed against the inflow orifice 16 when the residual pressure in the gas holder (not shown) reaches a predetermined minimum value. During this operation which corresponds to the main purpose of the residual-pressure valve, a gasket 24 on the lower part of the valve is pressed against the seat 26 at the gas inflow orifice 16.

According to the invention, the piston-shaped residual-pressure valve 8 is also used for terminating a normal gas extraction from the gas holder (not shown), specifically in that the shutoff screw body 10 is shifted axially downwards, for example by means of a square socket 28, until it exerts mechanical stress on the piston of the residual-pressure valve 8 and thereafter presses the latter sealingly against the seat 26 at the gas inflow orifice 16 counter to the pressure of the gas escaping from the orifice 16.

One aspect of the invention is the design of the connection fitting 12 which serves both for refilling the gas holder and for its vacuum emptying. Essential elements of this connection fitting 12 are a seal 34, for example obtained by means of an O-ring, at a first location within the valve body 6, between the latter and the connection fitting 12, and a pin or bolt 36 with a conical tip 36*a*. A spring 42 loads the bolt axially. This bolt is guided and held inside the connection fitting by means of four webs 38, the interspaces between these webs forming gas throughflow orifices.

For vacuum emptying, the following operation takes place:

The shut-off screw body 10 is opened, and the residual-pressure valve 8 is closed (not shown) under the effect of the spring 22. When the connection fitting 12 is screwed onto the valve body 6, the tip 36*a* of the bolt 36 comes into contact with a correspondingly conical taper 8*a* of the lower edge of the residual-pressure valve 8. When the fitting 12 is screwed further in, under the effect of the stronger spring 42 the residual-pressure valve 8 is lifted from the seat 26 in opposition to the weaker spring 22 and the orifice of the bore 14 is exposed. Now when a vacuum is applied to the gas connection 40 of the connection fitting 12, for example by means of a vacuum pump, the gas holder can be emptied down to any vacuum.

This is especially important during the filling operation which is carried out by means of the same connection fitting 12. Here too, the mutual position of the bolt 36 and residual-pressure valve 8 according to FIG. 1 is obtained by subjecting the orifice 40 to pressure. The bolt 36 now performs the actual function assigned to it, namely of preventing a fluttering of the residual-pressure valve 8 during the filling operation, this being associated with annoying noises and, above all, with premature wear of the latter.

After the refilling of the gas holder has been concluded, the valve is closed again as a result of rotation carried out on the shutoff screw body. During this closing operation, the vertical movement of the residual-pressure valve 8 causes the bolt 36 to be displaced to the right out of the position shown in FIG. 1. When the valve is closed, the connection fitting 12 can be unscrewed from the valve body 6.

Figure 2:
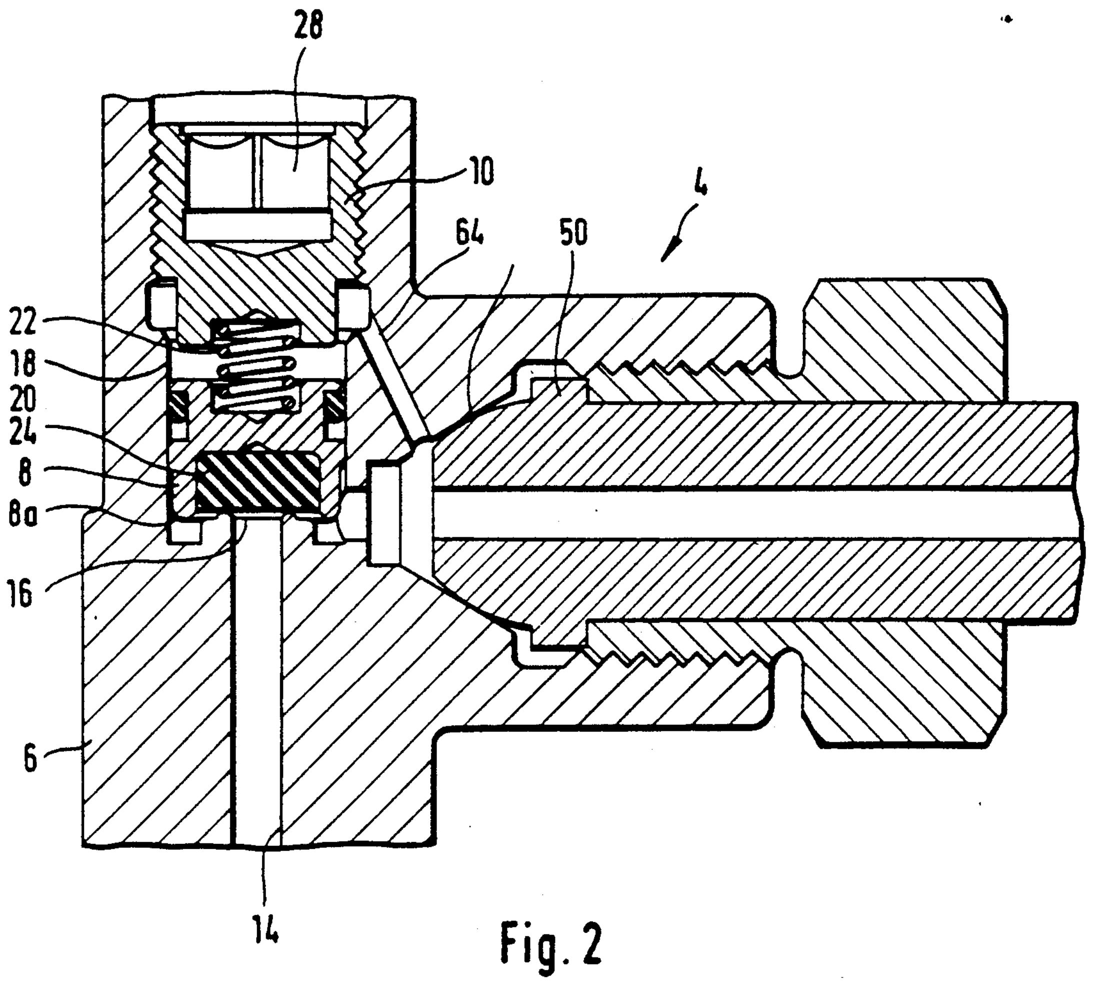
FIG. 2 shows the valve arrangement according to FIG. 1, but with a second connection fitting for the normal gas-extraction mode and with the residual-pressure valve in the closed position.

For the normal gas-extraction mode, the connection fitting 12 according to FIG. 1 is replaced by the connection fitting 50 according to FIG. 2. In this (second) connection fitting 50, the seal between the latter and the valve body 6 is at a location 52 which is situated downstream of the location 34 on the fitting 12. This shift of the sealing-off point renders operative a bypass channel 54 between the space between the shut-off screw body 10 and the residual-pressure valve 8 with the gas-conveying interior of the valve body 6. The purpose of this measure is to prevent fluctuations in gas pressure between the body 10 and the residual-pressure valve piston 8. Such pressure fluctuations between the body 10 and the residual-pressure valve 8, such as would occur during the mutual axial displacement of these parts, would falsify the effect of the residual-pressure spring 22 in an uncontrollable way.

What is claimed is:

1. A valve arrangement for the filling and emptying of a gas holder, said valve arrangement comprising a valve body (6) having a gas inflow orifice (16) adapted to communicate with the gas holder, a piston-shaped residual pressure valve (8) supported in said body to move between closed and open positions relative to said orifice, a threaded bore in said body and communicating with said orifice when said residual pressure valve is in said open position, an adjustable shut-off screw (10) spaced axially from said residual pressure valve, and a compression spring (22) located between said screw and said residual pressure valve and operable to force said residual pressure valve to said closed position when the residual pressure in said orifice falls to a predetermined level, said valve arrangement being characterized by a first connection fitting (12) for effecting filling or vacuum emptying of the gas holder, said first connection fitting being screwable into said bore in said valve body and having means (36) for automatically moving said residual pressure valve to said open position as said fitting is screwed into said bore, said first fitting sealingly engaging said body at a first predetermined location when said fitting is screwed into said bore, and a second connection fitting (50) for effecting normal emptying of said gas holder, said second fitting being screwable into said bore of said valve body in place of said first fitting and sealingly engaging said body at a second location (52) located downstream of said first location in the direction of emptying flow, there being a bypass channel (54) leading from a point between said first and second locations to a point within said valve body between said shut-off screw and said residual pressure valve, the location of said bypass channel causing the channel to be inoperative when said first fitting is threaded into said bore and to be operative when said second fitting is threaded into said bore.

2. A valve arrangement according to claim 1, characterized in that said means (36) comprise a spring-loaded pin having a conical tip (36*a*), said residual pressure valve having an oblique edge (8*a*) which is engaged by said tip to move said residual pressure valve to said open position as said first connection fitting is screwed into said bore.

* * * * *